Figure 1:
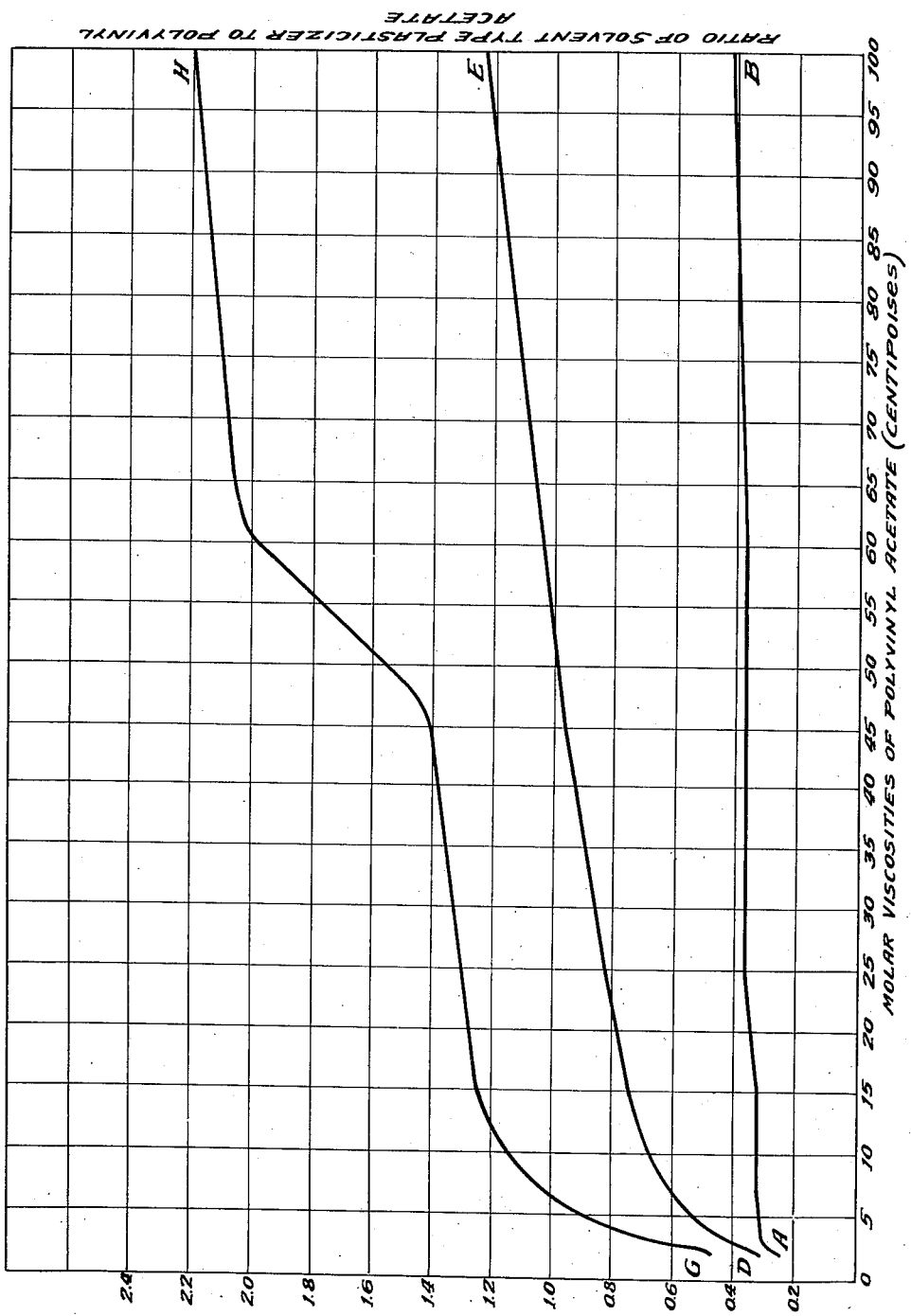

March 6, 1945. R. STONE 2,371,001
FLEXIBLE COATED SHEET MATERIAL
Filed Oct. 26, 1944 2 Sheets-Sheet 1

Inventor:
Raymond Stone
By: Zabel, Carlson, Gritzbaugh & Wells
Attorneys

March 6, 1945.  R. STONE  2,371,001

FLEXIBLE COATED SHEET MATERIAL

Filed Oct. 26, 1944  2 Sheets-Sheet 2

Inventor:
Raymond Stone
By: Zabel, Carlson, Fitzbaugh & Wells
Attorneys

Patented Mar. 6, 1945

2,371,001

UNITED STATES PATENT OFFICE 2,371,001

FLEXIBLE COATED SHEET MATERIAL

Raymond Stone, Chicago, Ill.

Application October 26, 1944, Serial No. 560,500

8 Claims. (Cl. 117—161)

The invention relates to flexible coated sheet material, including bandages.

An object of this invention is to provide flexible sheet material coated with a composition which has strong cohesion to itself but relatively poor adhesion to materials other than the composition.

Another object is to provide flexible coated sheet material which is strongly self-cohesive but substantially non-adherent.

Another object is to provide a bandage which on contact with the skin of a person is substantially non-adherent but when wound upon itself is cohesive.

Hitherto self-cohesive but substantially non-adherent bandages have been made by impregnating a fabric such as gauze with a composition of unvulcanized rubber or rubber latex. Such bandages have been widely used since they have the advantage that they may be wrapped around an extremity or other injured part so that the successive windings of the bandage adhere firmly to one another, the bandage requiring neither pins, strings nor adhesive tape to hold it in place and yet being capable of easy and painless removal since it does not adhere to the skin, hair or clothing. However, it was early realized by the various manufacturers that such bandages had many inherent disadvantages. The product had only very limited lasting qualities; that is, when exposed to the air the rubber coating which imparts the self-cohesive properties to the bandage oxidizes over a very short period of time and thereby becomes dark, hard and brittle and loses all of its self-cohesiveness. Furthermore, since rubber is partially soluble in cutting, penetrating and lubricating oils of the type which machine operators encounter, the bandage made from rubber is not oil resistant. Oil will loosen and remove this self-cohesive bandage made from rubber when the member and the bandage to which it is applied comes in contact with it. Also, self-cohesive bandages made from rubber have the disadvantage of possessing a "harsh feel" and are therefore often a source of irritation to the wound to which they are applied.

For these and other reasons, manufacturers of self-cohesive non-adherent bandages have been endeavoring to produce a self-cohesive, non-adherent bandage from materials other than unvulcanized rubber or rubber latex. As rubber become more difficult to obtain greater efforts were made to produce a satisfactory substitute, but so far as I know prior to my invention such efforts by others have been without success, although many compositions have been produced as a substitute for natural rubber which have been satisfactory for purposes other than for the production of self-cohesive, non-tacky bandages.

An object of this invention is therefore to provide a self-cohesive, substantially non-adherent bandage which does not have the disadvantages of the bandage made from unvulcanized rubber or rubber latex.

Another object is to provide a self-cohesive, substantially non-adherent bandage made from fabric impregnated with a commercially available synthetic plastic composition.

Another object is to provide a bandage which coheres exclusively to itself, which retains its self-cohesiveness when exposed to air over extremely long periods of time, which has a soft texture, is non-irritating to a wound, and will not loosen or fall off in the presence of cutting, lubricating or penetrating oils.

A further object is to provide coated paper, cloth, metal foil or the like capable of giving a good, dry seal when pressed upon material having a like coating but which has relatively poor adhesion to other materials such as uncoated paper, cloth or foil.

Another object is to provide articles of manufacture such as envelopes and bags having portions adapted to provide a surface coated so as to give a self-cohesive but relatively non-adherent seal.

Figure 2:
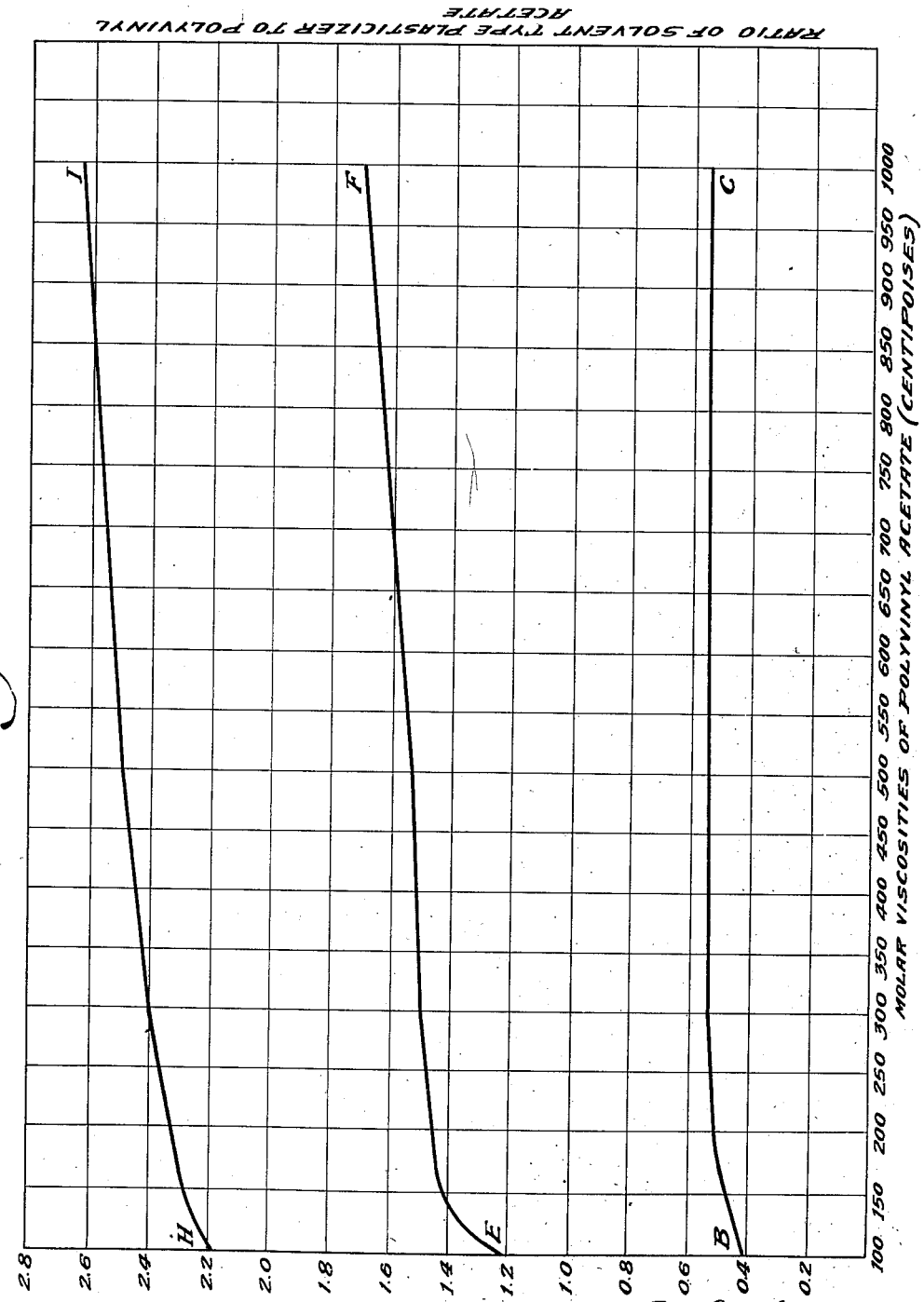

Other objects and advantages of my invention will become apparent as the following detailed description proceeds, reference being had to the accompanying drawings, in which Figs. 1 and 2 are graphs showing critical ratios of solvent plasticizer to polyvinyl acetate for a given molecular weight of polyvinyl acetate in order to provide a coating composition having operable and preferred cohesive but relatively non-adherent qualities.

Referring to the drawings, it will be seen that in Fig. 1 the weight ratio of solvent plasticizer to polyvinyl acetate is plotted as the ordinate and the molar viscosities (a measure of the molecular weight) of polyvinyl acetate is plotted as the abscissa.

Fig. 2 is an extension of Fig. 1 except that the scale of the molar viscosities has been made smaller than in Fig. 1 in order to reduce the length of the drawings.

In accordance with this invention, a flexible base such as paper, cloth and the like, is coated with a composition comprising a polyvinyl acetate having a molar viscosity of between approximately 2 and 1000 centipoises and a solvent plasticizer for the polyvinyl acetate. In general, a certain minimum proportion of solvent plasticizer to polyvinyl acetate is required for each respective molecular weight polyvinyl acetate in order to obtain satisfactory cohesion for bandages and sealing purposes. This proportion, which I call the "minimum ratio," is given by curve ABC of Figures 1 and 2. For proportions greater than this "minimum ratio," the higher the weight ratio of solvent plasticizer to polyvinyl acetate for a given molecular weight polyvinyl acetate the greater the cohesion obtained. For most purposes, it is preferable to use a ratio of solvent plasticizer to polyvinyl acetate which gives cohesion but substantially no adhesion. Bandages coated with such compositions will not stick to the skin or hair of the body when a strip of the bandage is wound around a portion of the body, but the strip will stick to itself when wound upon itself. Compositions having these properties have weight ratios of solvent plasticizers to polyvinyl acetate between the curve ABC and the curve DEF of Figures 1 and 2. The curve DEF of Figures 1 and 2 gives the maximum proportion of solvent plasticizer to polyvinyl acetate for each molecular weight polyvinyl acetate that can be used to obtain cohesion but substantially no adhesion. I call the proportions represented by curve DEF the "preferred maximum ratios." In some instances, it may be desired to obtain a certain amount of adhesion as well as cohesion. It may be desirable, for example, to make a bandage which in addition to being self-cohesive is sufficiently adhesive to prevent the bandage from slipping from the bandaged member. This adhesion, of course, should be relatively mild and should in no way compare with that of surgical adhesive tapes. The higher proportions of solvent plasticizer to polyvinyl acetate between the curves DEF and GHI of Figures 1 and 2 accomplish this result. Curve GHI gives the maximum proportion of solvent plasticizer to polyvinyl acetate for each molecular weight polyvinyl acetate which can be used to obtain relatively mild adhesion as well as cohesion. I call the proportions represented by curve GHI the workable "maximum ratios." Again it may be desirable to take advantage of the greater amount of cohesion that is obtained with the higher proportions of solvent plasticizer but at the same time to avoid most of the corresponding adhesion which results from the use of compositions containing a higher ratio of solvent plasticizer to polyvinyl acetate such as in the region between the curve DEF and the curve GHI. In order to obtain this result other modifying ingredients may be included which will reduce the adhesion of these compositions. Such modifying ingredients include oils which are incompatible with the polyvinyl acetate such as castor oil, acetylated castor oil, mineral oil and fatty alcohols such as octyl, nonyl, decyl and undecyl alcohol; and other resins such as polyvinyl alcohol, copolymerized vinyl acetate-vinyl chloride, and cellulose aceto propionate. In addition, the emulsifying agents which are used to form emulsions of polyvinyl acetate will ordinarily serve to reduce the adhesion of the deposited polyvinyl acetate-solvent plasticizer compositions.

The following table gives data for the graphs of Figs. 1 and 2:

*Critical weight ratios of solvent plasticizer to polyvinyl acetate*

| Molar viscosity of polyvinyl acetates | Minimum ratio | Preferred maximum ratio | Workable maximum ratio |
| --- | --- | --- | --- |
| 2 centipoises | 0.25 | 0.33 | 0.47 |
| 2½ centipoises | 0.29 | 0.37 | 0.51 |
| 7 centipoises | 0.33 | 0.62 | 1.04 |
| 15 centipoises | 0.33 | 0.75 | 1.25 |
| 25 centipoises | 0.37 | 0.83 | 1.30 |
| 45 centipoises | 0.37 | 0.96 | 1.40 |
| 60 centipoises | 0.37 | 1.03 | 1.97 |
| 100 centipoises | 0.41 | 1.22 | 2.19 |
| 155 centipoises | 0.48 | 1.43 | 2.29 |
| 300 centipoises | 0.54 | 1.50 | 2.40 |
| 500 centipoises | 0.54 | 1.53 | 2.49 |
| 725 centipoises | 0.54 | 1.61 | 2.57 |
| 1000 centipoises | 0.54 | 1.70 | 2.64 |

The molar viscosities shown in the above table and referred to in this specification are a measure of the molecular weights of the polyvinyl acetate. The molar viscosity is the viscosity in centipoises determined at 20° C. of a benzene solution containing 86 grams of polyvinyl acetate per liter.

The ratios of solvent plasticizer to polyvinyl acetate are determined by dividing the weight of the solvent plasticizer by the weight of the polyvinyl acetate in the composition.

The term solvent plastizer is a recognized term in the art of organic plastics. It refers to plasticizers which are solvents for the polyvinyl acetate in that they disperse the polyvinyl acetate to form so-called colloidal solutions. When, for example, the polyvinyl acetate is added to a substantially large excess of one of these solvent plasticizers and agitated, there is a substantial increase in viscosity and the formation of a colloidally homogeneous dispersion, whereas with a non-solvent plasticizer there is substantially no increase in viscosity.

Only solvent plasticizers are suitable for the practice of this invention. Plasticizers are distinguished from volatile solvents in that the plasticizers are much less volatile having a boiling point not substantially lower than 225° C. and often having a boiling point much higher than this.

Of the solvent plasticizers which are suitable for the practice of my invention, I preferably make use of dibutyl phthalate because it is relatively low in cost, it possesses sufficiently low volatility, and it is non-toxic when used in contact with the skin. Other suitable solvent plasticizers for polyvinyl acetate resins comprise the liquid diesters of phthalic acid—including diethyl phthalate, dipropyl phthalate, diamyl phthalate, and dihexyl phthalate—liquid aromatic ketones—including phenyl o-tolyl ketone and phenyl m-tolyl ketone—butyl o-benzoyl benzoate, alkyl phthalyl alkyl glycolates—including methyl phthalyl ethyl glycolate, ethyl phthalyl ethyl glycolate and butyl phthalyl butyl glycolate, esters of glycol and polyglycol ethers including the propionate ester of di- tri, or tetrapropylene glycol monophenyl ether and the propionate ester of di- or triethylene glycol monophenyl ether, and p-tertiary amyl phenoxy ethyl acetate, the polyglycol diesters including triethylene glycol di-2-ethyl butyrate, triethylene glycol dipropionate and hexa ethylene glycol dipropionate. Other solvent plasticizers for polyvinyl acetate which have been found suitable but which generally are not preferred include tricresyl phosphate, tributoxy ethyl phosphate and dicarbitol phthalate. In general any solvent plasticizer for polyvinyl acetate is suitable and many more of these plasticizers than those above mentioned will be apparent to those skilled in the art.

These solvent plasticizers appear to form what may be called an unsaturated solid solution of the polyvinyl acetate in the plasticizer. The formation of this unsaturated solid solution affords a possible explanation for the self-cohesion of these compositions. It is most likely that when two layers of flexible sheet material coated with these compositions are pressed together the solvent plasticizer present in each layer mutually dissolves a portion of the composition of the opposite layer and it is in this way that a cohesive bond is effected. In the light of this explanation it may be readily seen why it is necessary that the plasticizer present in the composition be of the solvent type and why also the solid solution of polyvinyl acetate in the solvent plasticizer be an unsaturated one, for if the plasticizer were of the non-solvent type or if the solvent solution were saturated it would not be possible for the plasticizer present in each layer to dissolve the composition of the adjacent layer and thus join the two layers together.

In preparing the flexible coated sheet material of this invention the self-coherent relatively non-adherent composition comprising the polyvinyl acetate and the solvent plasticizer is usually applied to the flexible base either in the form of a solution or an emulsion since the composition itself is too viscid for ready application to the base in commercial practice. In making a solution, ordinarily I mix with the polyvinyl acetate and the solvent plasticizer a volatile carrier which is a solvent both for the polyvinyl acetate and the solvent plasticizer.

In making up a coating solution of my composition for self-adhering bandages or other flexible sheet material either one or two procedures can be followed: (1) The solvent plasticizer may be mixed with the polyvinyl acetate and the volatile solvent thereafter incorporated in the mixture; or (2) the polyvinyl acetate may be dissolved in the volatile solvent and the solvent plasticizer thereafter, incorporated in the solution. Examples I, II and III below will serve to illustrate these two procedures.

In all examples given herein the proportions of ingredients are expressed as parts by weight.

Example I 1.8 parts of dibutyl phthalate were intimately mixed with 2.66 parts of polyvinyl acetate having a molar viscosity of 25 centipoises. To this mixture were added 12.34 parts of acetone, and the whole was stirred until all of the resin and non-volatile solvent dissolved in the acetone.

Example II 2.66 parts by weight of polyvinyl acetate having a molar viscosity of 25 centipoises were dissolved in 12.34 parts of acetone, and to the solution were added, with stirring, 1.8 parts of dibutyl phthalate.

Example III 24 parts by weight of polyvinyl acetate having a molar viscosity of 60 centipoises were dissolved in 15.6 parts of toluene, and to the solution were added 16.83 parts of the propionate ester of tripropylene glycol monophenyl ether.

Bandages made by impregnating an open mesh fabric with each of the solutions of Examples I, II and III were self-adhering but substantially non-tacky.

These same solutions may be used to coat other flexible sheet material such as paper, foil, and the like in order to render them self-cohesive but substantially non-tacky.

Although the compositions of Examples I, II and III can be used to form self-cohesive but substantially non-adhesive bandages, and other types of flexible sheeting, I have found it preferable in commercial practice to employ an aqueous emulsion of the polyvinyl acetate and the solvent plasticizer (substantially non-volatile solvent). The advantages of such an emulsion are that it presents less fire hazard, that it is more economical, and that it makes possible the incorporation of other water-dispersible ingredients. An effective emulsion may be prepared in any one of several ways. A solution containing polyvinyl acetate and solvent plasticizer may be formed in either of the two aforementioned ways. Thereafter the solution is emulsified in water with the aid of an emulsifying agent. Or as a modification of this method, the polyvinyl acetate may be dissolved in a volatile solvent. The solution is then emulsified in water and thereafter the plasticizer is incorporated with the emulsion.

The following is an example of the formation of an effective emulsion:

Example IV 57 parts of polyvinyl acetate having a molar viscosity of 25 centiposes were dissolved in 129.9 parts of toluene. To this solution were added 2.8 parts of oleic acid. This constituted the lacquer phase. A separate water phase was constituted by mixing 9.97 parts of 0.999 normal solution of sodium hydroxide with 31.2 parts of water. The lacquer phase then was added slowly to the water phase with rapid stirring. A milky white emulsion resulted.

To complete the formation of the composition, 43 additional parts of water and 38.0 parts of triethylene glycol di-2-ethyl butyrate were stirred into the milky white emulsion formed as described above.

I have found that the stability of such an emulsion can be improved by passing it through a colloid mill.

Emulsifying agents that I have found suitable for making emulsions by this method are sodium lauryl sulfonate and the reaction products of a higher fatty acid—such as oleic or ricinoleic acid—with either ammonia or sodium hydroxide, or triethanolamine or tri-isopropanolamine or morpholine.

It is also possible to make an emulsion of polyvinyl acetate without the use of a volatile solvent. The method involves emulsifying monomeric vinyl acetate in water with a suitable emulsifying agent. To this emulsion a suitable catalyst such as hydrogen peroxide or benzoyl peroxide is added. The emulsion is then refluxed for a time sufficient to cause the polymerization of the vinyl acetate to polyvinyl acetate. The molecular weight of the polymer produced in this manner depends upon a number of factors, including the temperature at which the reaction is conducted, the amount and nature of the catalyst used, and the length of time the reaction is allowed to proceed. After the polyvinyl acetate emulsion is thus formed, the solvent plasticizer is added either directly or in the form of an emulsion. The following is an example of a polyvinyl acetate emulsion prepared in this manner:

Example V 2.5 parts of sodium lauryl sulphate were dissolved in 125 parts of water. This was added with rapid stirring to 250 parts of monomeric vinyl acetate. To the resulting emulsion were added 125 additional parts of water and 3 parts of 30% hydrogen peroxide. The emulsion was refluxed at 60-70° C. for three to three and one-half hours, during which time the emulsified monomeric vinyl acetate polymerized to form a polyvinyl acetate emulsion. To 16.4 parts of this polyvinyl acetate emulsion were added 17 parts of a 25% emulsion of dibutyl phthalate.

Bandages and other forms of flexible sheeting made with this emulsion were strongly self-adhering but non-tacky.

In the commercial manufacture of self-cohesive bandages, the fluid coating solution or aqueous emulsion is applied to gauze of any desired mesh or to other suitable fabric. The method of application may be by dipping from rollers, or in any other suitable manner. The treated gauze then is dried in a commercial type drying oven using hot air, infra-red lamps, or any other suitable means of evaporating the volatile solvents and diluents. In one embodiment of this invention, the coating and impregnating solution is of such viscosity that on drying the impregnated fabric gauze is still substantially porous, the major part of the vinyl resin composition coating and impregnating the fibers and leaving openings between the fibers so that the bandage is still of a substantially open mesh type. The gauze after drying is then cut into various commercial sizes and packaged. The product may be used in the same manner as the common gauge bandage but possesses the great advantage thereover in that my bandage adheres firmly to itself, requires no pins, strings or adhesive tape to hold it in place, and it can be removed easily and painlessly.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

This application is a continuation in part of my co-pending application Serial No. 541,853, filed June 23, 1944, which in turn is a continuation in part of my co-pending application Serial No. 483,192, filed April 15, 1943.

I claim:

1. A bandage which on contact with the skin of a person is relatively non-adherent to the skin but is cohesive when wound upon itself, said bandage comprising a gauze cloth strip having a coating on both sides of a composition consisting essentially of an unsaturated solid solution of a polyvinyl acetate in dibutyl phthalate, the weight ratio of dibutyl phthalate to polyvinyl acetate being between approximately 0.25 and 2.6, the molar viscosity of said polyvinyl acetate being between approximately 2 and 1000 centipoises, and the weight ratio of dibutyl phthalate to polyvinyl acetate of a given molar viscosity being approximately within the range between the curve ABC of Figure 1 and Figure 2 and the curve GHI of Figure 1 and Figure 2.

2. A bandage which on contact with the skin of a person is relatively non-adherent to the skin but is cohesive when wound upon itself, said bandage comprising a gauze cloth strip having a coating on both sides of a composition consisting essentially of an unsaturated solid solution of a polyvinyl acetate in the propionate ester of tripropylene glycol monophenyl ether, the weight ratio of the propionate ester of tripropylene glycol monophenyl ether to polyvinyl acetate being between approximately 0.25 and 2.6, the molar viscosity of said polyvinyl acetate being between approximately 2 and 1000 centipoises, and the weight ratio of the propionate ester of tripropylene glycol monophenyl ether to polyvinyl acetate of a given molar viscosity being approximately within the range between the curve ABC of Figure 1 and Figure 2 and the curve GHI of Figure 1 and Figure 2.

3. A bandage which on contact with the skin of a person is relatively non-adherent to the skin but is cohesive when wound upon itself, said bandage comprising a gauze cloth strip having a coating on both sides of a composition consisting essentially of an unsaturated solid solution of a polyvinyl acetate in triethylene glycol di-2-ethyl butyrate, the weight ratio of triethylene glycol di-2-ethyl butyrate to polyvinyl acetate being between approximately 0.25 and 2.6, the molar viscosity of said polyvinyl acetate being between approximately 2 and 1000 centipoises, and the weight ratio of triethylene glycol di-2-ethyl butyrate to polyvinyl acetate of a given molar viscosity being approximately within the range between the curve ABC of Figure 1 and Figure 2 and the curve GHI of Figure 1 and Figure 2.

4. A bandage which on contact with the skin of a person is substantially non-adherent to the skin but is cohesive when wound upon itself, said bandage comprising a gauze cloth strip having a coating on both sides of a composition consisting essentially of an unsaturated solid solution of a polyvinyl acetate in dibutyl phthalate, the weight ratio of dibutyl phthalate to polyvinyl acetate being between approximately 0.25 and 1.7, the molar viscosity of said polyvinyl acetate being approximately between 2 and 1000 centipoises, and the weight ratio of dibutyl phthalate to polyvinyl acetate of a given molar viscosity being approximately within the range between the curve ABC of Figure 1 and Figure 2 and the curve DEF of Figure 1 and Figure 2.

5. A bandage which on contact with the skin of a person is substantially non-adherent to the skin but is cohesive when wound upon itself, said bandage comprising a gauze cloth strip having a coating on both sides of a composition consisting essentially of an unsaturated solid solution of a polyvinyl acetate in the propionate ester of tripropylene glycol monophenyl ether, the weight ratio of the propionate ester of tripropylene glycol monophenyl ether to polyvinyl acetate being between approximately 0.25 and 1.7, the molar viscosity of said polyvinyl acetate being between approximately 2 and 1000 centipoises, and the weight ratio of the propionate ester of tripropylene glycol monophenyl ether to polyvinyl acetate of a given molar viscosity being approximately within the range between the curve ABC of Figure 1 and Figure 2 and the curve DEF of Figure 1 and Figure 2.

6. A bandage which on contact with the skin of a person is substantially non-adherent to the skin but is cohesive when wound upon itself, said bandage comprising a gauze cloth strip having a coating on both sides of a composition consisting essentially of an unsaturated solid solution of a polyvinyl acetate in triethylene glycol di-2-ethyl butyrate, the weight ratio of triethylene glycol di-2-ethyl butyrate to polyvinyl acetate being between approximately 0.25 and 1.7, the molar viscosity of said polyvinyl acetate being between approximately 2 and 1000 centipoises, and the weight ratio of triethylene glycol di-2-ethyl butyrate to polyvinyl acetate of a given molar viscosity being approximately within the range between the curve ABC of Figure 1 and Figure 2 and the curve DEF of Figure 1 and Figure 2.

7. A bandage which on contact with the skin of a person is substantially non-adherent to the skin but is cohesive when wound upon itself, said bandage comprising a strip of gauze cloth having a coating on both sides of a composition consisting essentially of an unsaturated solid solution of a polyvinyl acetate in a solvent plasticizer, the weight ratio of the solvent plasticizer to the polyvinyl acetate being between approximately 0.25 and 1.7, the molar viscosity of said polyvinyl acetate being between approximately 2 and 1000 centipoises, and the weight ratio of solvent plasticizer to polyvinyl acetate of a given molar viscosity being approximately within the range between the curve ABC of Figure 1 and Figure 2 and the curve DEF of Figure 1 and Figure 2.

8. A bandage which on contact with the skin of a person is relatively non-adherent to the skin but is cohesive when wound upon itself, said bandage comprising a strip of gauze cloth having a coating on both sides of a composition consisting essentially of an unsaturated solid solution of a polyvinyl acetate in a solvent plasticizer, the weight ratio of the solvent plasticizer to the polyvinyl acetate being between approximately 0.25 and 2.6, the molar viscosity of said polyvinyl acetate being between approximately 2 and 1000 centipoises, and the weight ratio of solvent plasticizer to polyvinyl acetate of a given molar viscosity being approximately within the range between the curve ABC of Figure 1 and Figure 2 and the curve GHI of Figure 1 and Figure 2.

RAYMOND STONE.